(12) United States Patent
Chao et al.

(10) Patent No.: US 11,686,935 B2
(45) Date of Patent: Jun. 27, 2023

(54) INTERFEROMETRIC STRUCTURED ILLUMINATION FOR DEPTH DETERMINATION

(71) Applicant: Meta Platforms Technologies, LLC, Menlo Park, CA (US)

(72) Inventors: Qing Chao, Redmond, WA (US); Zhaoming Zhu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/261,531

(22) Filed: Jan. 29, 2019

(65) Prior Publication Data

US 2022/0413284 A1    Dec. 29, 2022

(51) Int. Cl.
| | |
|---|---|
| G02B 27/00 | (2006.01) |
| G06F 3/01 | (2006.01) |
| G01B 11/22 | (2006.01) |
| G01B 11/25 | (2006.01) |
| H04N 23/56 | (2023.01) |
| H04N 23/74 | (2023.01) |
| G02B 27/01 | (2006.01) |

(52) U.S. Cl.
CPC .......... *G02B 27/0093* (2013.01); *G01B 11/22* (2013.01); *G01B 11/25* (2013.01); *G06F 3/013* (2013.01); *H04N 23/56* (2023.01); *H04N 23/74* (2023.01); *G02B 27/0172* (2013.01); *G02B 2027/0138* (2013.01); *G02B 2027/0178* (2013.01)

(58) Field of Classification Search
CPC .... G02B 27/0093; G01B 11/22; G01B 11/25; G06F 3/013; H04N 5/2256; H04N 5/2354

USPC .......................................................... 348/136
See application file for complete search history.

(56) References Cited

U.S. PATENT DOCUMENTS

| | | | | | |
|---|---|---|---|---|---|
| 4,337,993 | A  * | 7/1982 | Kompfner | ............ | G02B 5/1857 |
| | | | | | 359/34 |
| 8,416,423 | B2 * | 4/2013 | Inada | .................. | G03F 7/70775 |
| | | | | | 356/499 |
| 2006/0221063 | A1* | 10/2006 | Ishihara | .............. | G06F 3/03545 |
| | | | | | 348/E9.026 |
| 2006/0244907 | A1* | 11/2006 | Simmons | ............... | G02B 27/46 |
| | | | | | 351/159.26 |
| 2009/0174867 | A1* | 7/2009 | Malfait | ............. | G02B 19/0052 |
| | | | | | 353/69 |
| 2010/0073461 | A1* | 3/2010 | Hammes | ............ | G01B 11/2545 |
| | | | | | 348/42 |

(Continued)

*Primary Examiner* — Christopher S Kelley
*Assistant Examiner* — Asmamaw G Tarko
(74) *Attorney, Agent, or Firm* — Fenwick & West LLP

(57) ABSTRACT

A depth camera assembly (DCA) has a light source assembly, a mask, a camera assembly, and a controller. The light source assembly includes at least one light source. The mask is configured to generate an interference pattern that is projected into a target area. The mask has two openings configured to pass through light emitted by the at least one light source, and the light passed through the two openings forms an interference pattern across the target area. The interference pattern has a phase based on a position of the light source. The camera assembly is configured to capture images of a portion of the target area that includes the interference pattern. The controller is configured to determine depth information for the portion of the target area based on the captured images.

20 Claims, 6 Drawing Sheets

(56) References Cited

U.S. PATENT DOCUMENTS

| | | | |
|---|---|---|---|
| 2010/0112733 A1* | 5/2010 | Furukawa | G03F 7/706 |
| | | | 257/E21.328 |
| 2010/0290060 A1 | 11/2010 | Mohazzab et al. | |
| 2011/0267486 A1* | 11/2011 | Kane | H04N 5/23264 |
| | | | 348/222.1 |
| 2013/0301909 A1* | 11/2013 | Sato | G03H 1/0443 |
| | | | 382/154 |
| 2015/0192411 A1* | 7/2015 | Hutchin | G01S 3/7867 |
| | | | 356/493 |
| 2016/0033771 A1* | 2/2016 | Tremblay | G02B 26/10 |
| | | | 345/8 |
| 2016/0146927 A1* | 5/2016 | Hudman | G01S 7/4814 |
| | | | 359/558 |
| 2016/0349746 A1* | 12/2016 | Grau | G05D 1/0094 |
| 2017/0000342 A1* | 1/2017 | Samec | A61M 21/02 |
| 2017/0131765 A1* | 5/2017 | Perek | G02B 5/3083 |
| 2017/0255015 A1* | 9/2017 | Geng | G02B 6/0008 |
| 2018/0136471 A1* | 5/2018 | Miller | G02B 27/017 |
| 2018/0172974 A1* | 6/2018 | Croquette | G02B 5/005 |
| 2018/0181062 A1* | 6/2018 | Yurt | G03H 1/0808 |
| 2018/0239423 A1* | 8/2018 | Mardanbegi | A61B 3/113 |
| 2018/0242841 A1* | 8/2018 | Hainzl | A61B 3/113 |
| 2018/0246590 A1* | 8/2018 | Trail | G06F 3/041 |
| 2019/0012540 A1* | 1/2019 | Trail | G02B 27/0093 |
| 2019/0041634 A1* | 2/2019 | Popovich | G02B 27/017 |
| 2019/0041660 A1* | 2/2019 | Ahmed | G02B 27/48 |
| 2019/0226830 A1* | 7/2019 | Edwin | G01B 11/14 |
| 2019/0246091 A1* | 8/2019 | Bikumandla | H04N 13/254 |
| 2020/0241271 A1* | 7/2020 | Fujikake | G02B 21/0056 |
| 2020/0359004 A1* | 11/2020 | Saari | H04N 13/257 |

\* cited by examiner

Double Pinhole Mask 500

Double Slit Mask 600

INTERFEROMETRIC STRUCTURED ILLUMINATION FOR DEPTH DETERMINATION

BACKGROUND

The present disclosure generally relates to depth determination, and specifically relates to a depth camera assembly that can use light generating using masks for generating light interference patterns.

To achieve compelling user experience in artificial reality systems, it is essential to rely on accurate and efficient depth cameras for sensing three-dimensional (3D) features. For example, depth cameras can be used to capture an environment surrounding a user. Depth cameras can also be used for eye tracking, which refers to the process of detecting the direction of a user's gaze, e.g., detecting an orientation of an eye in 3-dimensional (3D) space. However, it is challenging to design depth cameras having a high performance, high speed, low computational power, and compact form factor.

For example, conventional eye tracking systems commonly use a small number of light sources that emit light which is reflected by the eye, and a camera is used to image the reflection of the light sources from the eye. An orientation of the eye is determined using the captured images. However, the small number of light sources results in a limited model of the eye with a lot of inaccuracies. In addition, the light sources used in conventional systems have high power consumption; for example, an array of eight LEDs can consume more than 0.1 Watt or more. Light sources added to achieve more accurate eye tracking can quickly exceed the power budget allotted to the eye tracking subsystem.

SUMMARY

A depth camera assembly includes at least one light source and a mask for generating an interference pattern that is projected across a target area and used to determine depth information. The mask is positioned between the at least one light source and the target area being imaged. For example, the mask includes two openings (e.g., two pinholes, or two slits), and the light emitted from the at least one light source and projected from the two openings creates an interference pattern on the target area. The interference pattern for a given light source has a phase that is based on the position of the light source. If the depth camera assembly includes multiple light sources, different light sources can be arranged so that they produce interference patterns with different phases. Imaging the area with multiple different interference patterns can improve the accuracy of the depth information determine from the images.

A camera assembly captures images of the interference pattern(s) on the target area, and passes the captured images to a controller. The controller determines depth information based on the captured images. The combination of the light source and the mask is a compact design with lower power requirements. The light source and mask provide a dense illumination pattern for accurate depth tracking. Embodiments with two or more light sources generating two or more phase-offset interference patterns provide even greater spatial resolution for imaging. Vertical cavity surface emitting lasers (VCSELs) may be used to generate high speed illuminations, allowing the depth camera to switch between two or more light sources quickly.

In some embodiments, a depth camera assembly is described herein. The depth camera assembly includes a light source assembly, a mask, a camera assembly, and a controller. The light source assembly includes at least one light source. The mask is configured to generate an interference pattern that is projected into a target area. The mask comprises two openings configured to pass through light emitted by the at least one light source, and the light passed through the two openings forms an interference pattern across the target area. The interference pattern has a phase that is based on a position of the light source. The camera assembly is configured to capture images of a portion of the target area that includes the interference pattern. The controller is configured to determine depth information for the portion of the target area based on the captured images.

In some embodiments, an eyewear device is described herein. The eyewear device includes a frame, a light source assembly, a mask, a camera assembly, and a controller. The light source assembly is coupled to the frame and includes at least one light source. The mask is coupled to the light source assembly and is configured to generate an interference pattern that is projected into a target area. The mask comprises two openings configured to pass through light emitted by the at least one light source. The light passed through the two openings forms an interference pattern across the target area, and the interference pattern has a phase that is based on a position of the light source. The camera assembly is coupled to the frame and is configured to capture images of a portion of the target area that includes the interference pattern. The controller is configured to determine depth information for the portion of the target area based on the captured images.

Figure 1:
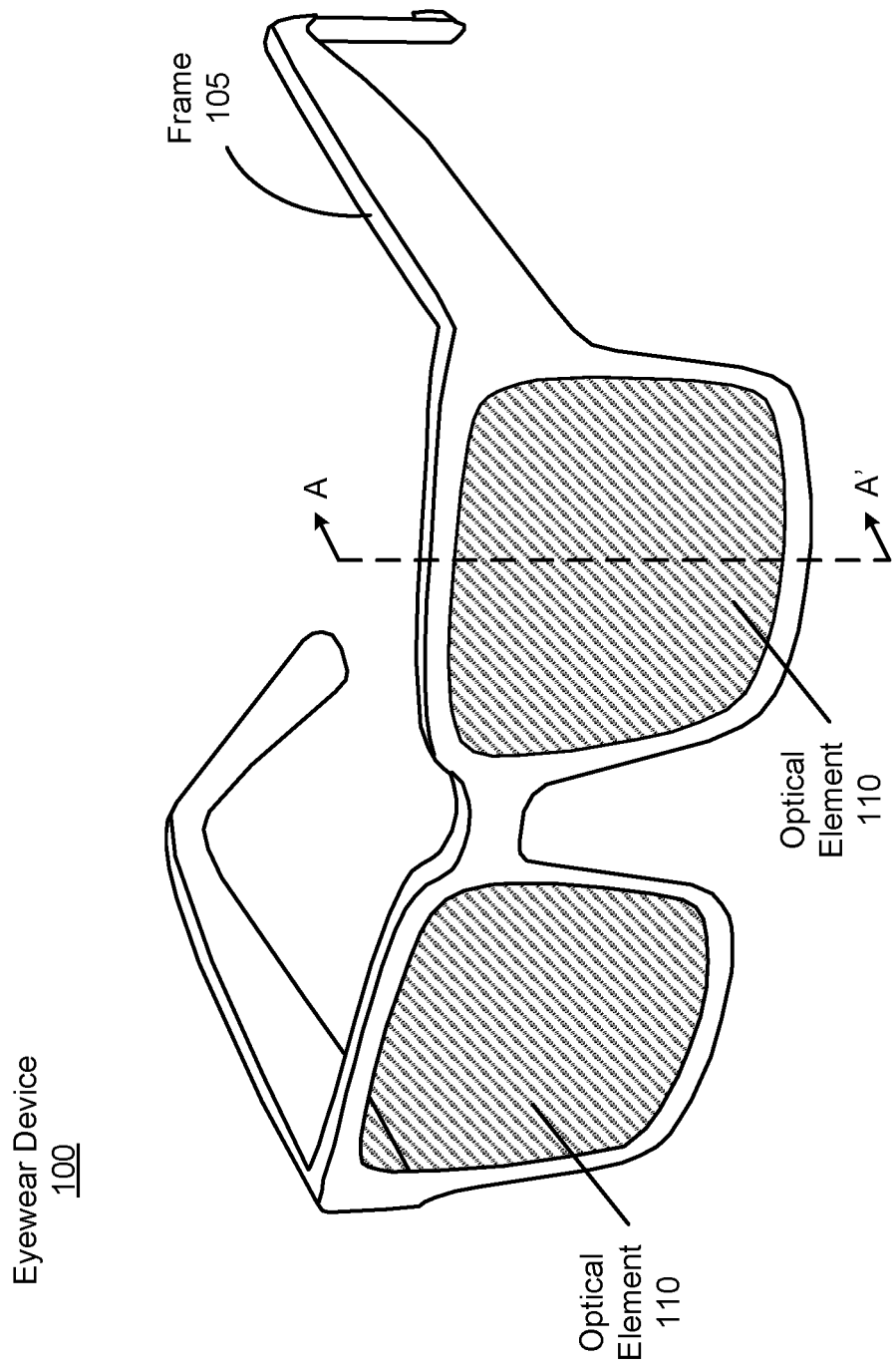
FIG. 1 is a diagram of an eyewear device, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A light source emits light that passes through a mask. A portion of the emitted light is projected through the mask to form an interference pattern across a target area, such as an eye or portion of a user's face. The mask includes multiple openings (e.g., two pinholes, or two slits), and the light emitted from the light source passes though the different openings to create the interference pattern. A camera assembly captures images of the interference pattern on the target area. A controller receives the captured images and determines depth information for the target area based on the captured images. The controller may determine tracking information based on the depth information, e.g., eye and/or facial tracking information. The infringement pattern projected from the mask is a dense illumination pattern that can be used to obtain accurate depth information with low power and a compact form factor. In some embodiments, multiple light sources at different positions relative to the mask are used to produce different interference patterns across the target area, e.g., multiple interference patterns that are offset from one another in phase. These interference patterns can be multiplexed in time (e.g., one interference pattern is formed at a time) or by using different light characteristics (e.g., polarization and/or wavelength). Using two or more light sources to generate multiple different interference patterns across the target area leads to even greater spatial resolution for imaging.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) or a near-eye display (NED) connected to a host computer system, a standalone HMD, a standalone NED, a mobile device or computing system, or any other hardware platform capable of providing artificial reality content to one or more viewers.

FIG. 1 is a diagram of an eyewear device 100, in accordance with one or more embodiments. In some embodiments, the eyewear device 100 is a NED for presenting media to a user. Examples of media presented by the eyewear device 100 include one or more images, text, video, audio, or some combination thereof. In some embodiments, audio is presented via an external device (e.g., speakers and/or headphones) that receives audio information from the eyewear device 100, a console (not shown), or both, and presents audio data based on the audio information. The eyewear device 100 may be configured to operate as an artificial reality NED. In some embodiments, the eyewear device 100 may augment views of a physical, real-world environment with computer-generated elements (e.g., images, video, sound, etc.).

In other embodiments, the eyewear device 100 does not present media or information to a user. For example, the eyewear device 100 may be used in conjunction with a separate display. In other embodiments, the eyewear device 100 may be used for various research purposes, training applications, biometrics applications (e.g., fatigue or stress detection), automotive applications, communications systems for the disabled, or any other application in which eye tracking can be used.

The eyewear device 100 shown in FIG. 1 includes a frame 105 and two optical elements 110 held in the frame 105. In some embodiments, the frame 105 represents a frame of eye-wear glasses. The optical elements 110 may be configured for users to see content presented by the eyewear device 100. For example, the optical elements 110 can include at least one waveguide display assembly (not shown) for directing one or more image light to an eye of the user. A waveguide display assembly includes, e.g., a waveguide display, a stacked waveguide display, a stacked waveguide and powered optical elements, a varifocal waveguide display, or some combination thereof. For example, the waveguide display may be monochromatic and include a single waveguide. In some embodiments, the waveguide display may be polychromatic and include a single waveguide. In yet other embodiments, the waveguide display is polychromatic and includes a stacked array of monochromatic waveguides that are each associated with a different band of light, i.e., each waveguide in the array is a source of a different color. A varifocal waveguide display is a display that can adjust a focal position of image light emitted from the waveguide display. In some embodiments, a waveguide display assembly may include a combination of one or more monochromatic waveguide displays (i.e., a monochromatic waveguide display or a stacked, polychromatic waveguide display) and a varifocal waveguide display. Some examples of waveguide displays are described in detail in U.S. patent application Ser. No. 15/495,373, incorporated herein by references in its entirety. Other types of displays may be used. For example, the optical elements 110 may include curved combiners with scanners, or holographic combiners.

In some embodiments, the optical element 110 may include one or more lenses or other layers, such as lenses for filtering ultraviolet light (i.e., sunglass lenses), polarizing lenses, corrective or prescription lenses, safety lenses, 3D lenses, tinted lenses (e.g., yellow tinted glasses), reciprocal focal-plane lenses, or clear lenses that do not alter a user's view. The optical element 110 may include one or more additional layers or coatings, such as protective coatings, or coatings for providing any of the aforementioned lens functions. In some embodiments, the optical element 110 may include a combination of one or more waveguide display assemblies, other types of display assemblies, one or more lenses, and/or one or more other layers or coatings.

Figure 2:
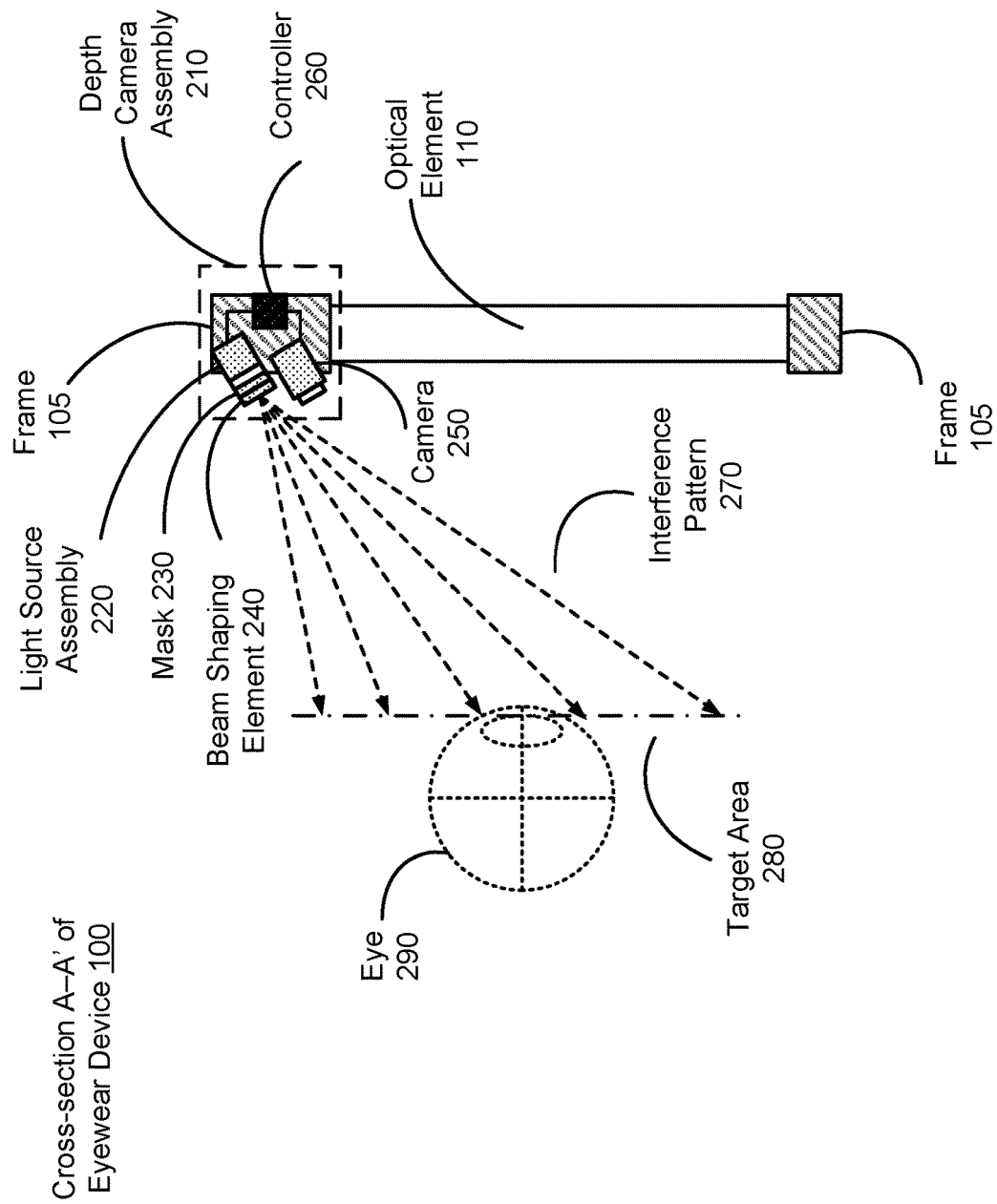
FIG. 2 is cross-section A-A' of the eyewear device illustrated in FIG. 1, in accordance with one or more embodiments.

FIG. 2 is cross-section A-A' of the eyewear device 100 illustrated in FIG. 1, in accordance with one or more embodiments. The optical element 110 is housed in the frame 105. A depth camera assembly (DCA) 210 is embedded in the frame 105. The DCA 210 includes a light source assembly 220, a mask 230, a beam shaping element 240, and a camera 250. The light source assembly 220, mask 230, and beam shaping element 240 are embedded at one portion of the frame 105. The light source assembly 220 emits light that passes through the mask 230 and forms an interference pattern 270. The light passed through the mask 230 is optionally passed through a beam shaping element 240 that modifies the projected interference pattern 270. The interference pattern 270 is projected into a target area 280 that includes a user's eye 290. The camera 250 is embedded in the frame 105 at a different position from the light source assembly 220, mask 230, and beam shaping element 240. The camera 250 captures images of the projected interference pattern 270 on the target area 280 including the eye 290. The DCA 210 also include a controller 260, which receives the images captured by the camera 250. The controller 260 determines depth information based on the received images. In the embodiment shown in FIG. 2, the DCA 210 is an eye tracking system for determining eye tracking information from the depth information. The controller 260 may determine a gaze location of the eye 290 based on the depth information.

The light source assembly 220 includes one or more light sources that are aligned with the mask 230 to generate the interference pattern 270. A light source may be, for example, one or more vertical cavity surface emitting lasers (VCSELs), one or more laser diodes (e.g., edge emitters), one or more inorganic or organic LEDs, or some other coherent source. The light source assembly 220 includes one or more light sources configured to emit light at a particular wavelength or within a particular band of wavelengths. The light source assembly 220 may be configured to emit light in a sub-division of a band, e.g., in the near-infrared band or in the short-wavelength infrared band. For example, a given light source can be configured to emit at multiple frequencies within a particular band, e.g., between 800 nm and 960 nm. As another example, different light sources can be configured to emit at different frequencies, e.g., one light source at 850 nm, and another light source at 940 nm. The wavelength or band of wavelengths emitted by the light source assembly 220 may be selected to not be visible to the user. The light source assembly 220 may also be configured to emit light at one or more particular polarizations. For example, the light source assembly 220 includes one or more polarizers configured to permit a particular polarization (e.g., vertical, 45°, horizontal, etc.) to pass. The light source assembly 220 may include different polarizers for different light sources, e.g., a vertical polarizer on one light source, and a horizontal polarizer on another light source.

Figure 3:
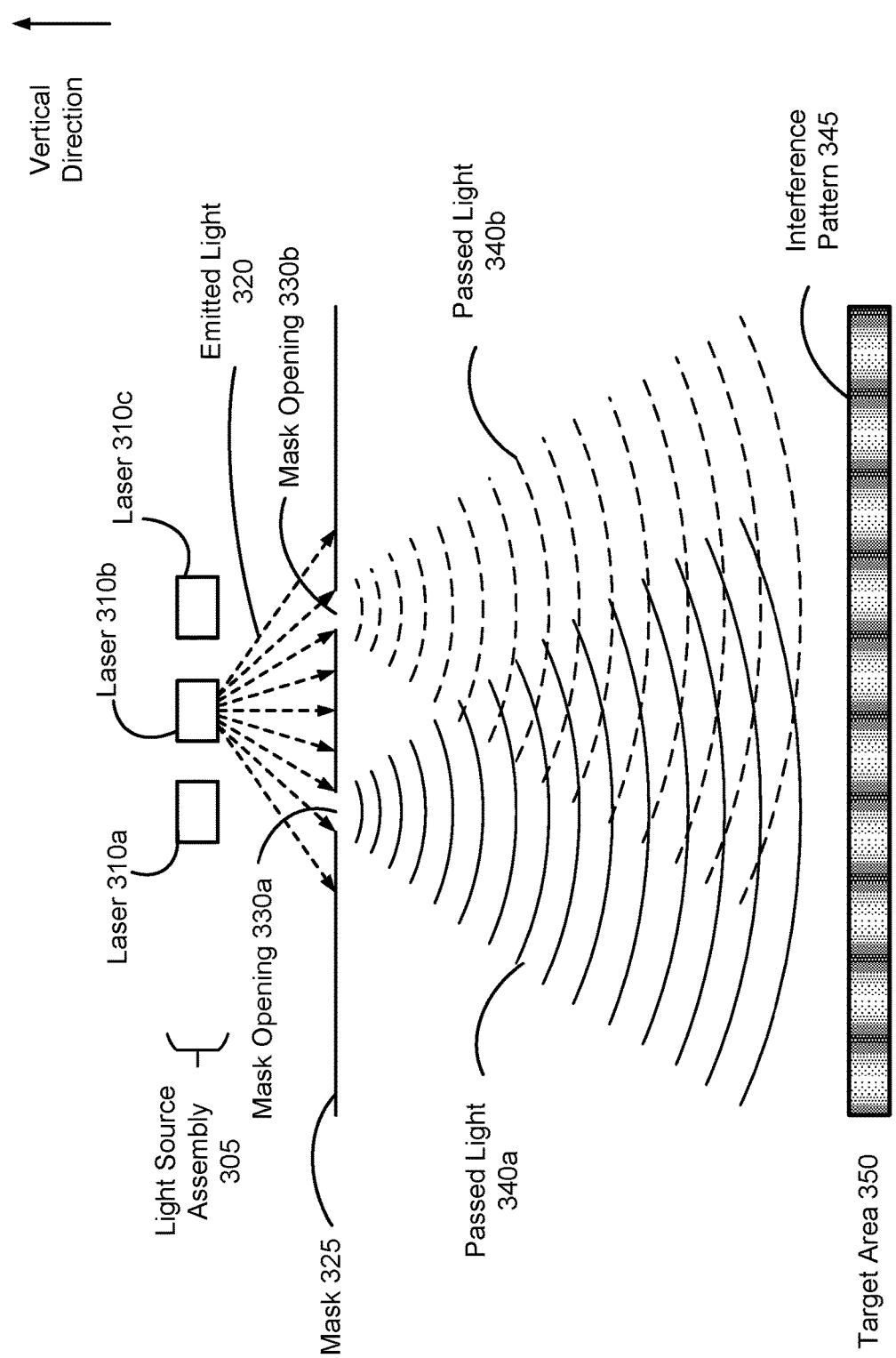
FIG. 3 is a diagram showing a light source assembly and a mask of a depth camera assembly generating an interference pattern across a target area, in accordance with one or more embodiments.
Figure 4:
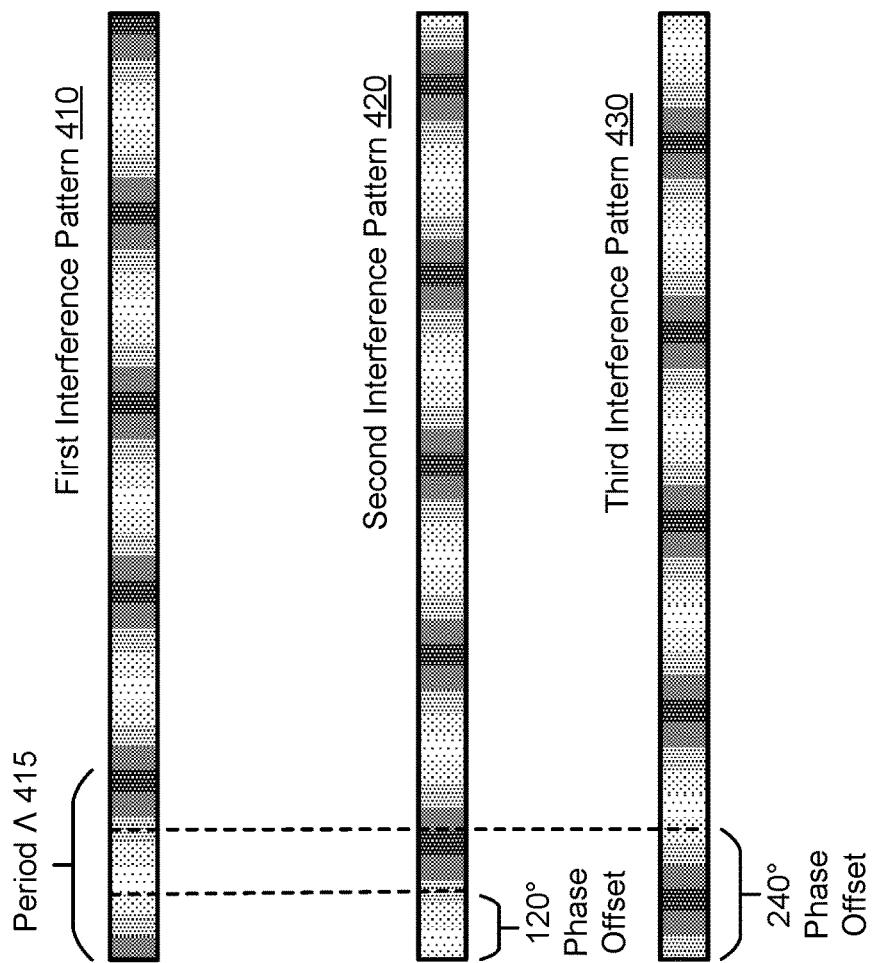
FIG. 4 shows three exemplary interference patterns offset in phase, in accordance with one or more embodiments.

Light emitted from the light source assembly 220 passes through the mask 230. The mask 230 blocks a portion of the light emitted from the light source assembly 220. In some embodiments, two openings in the mask 230 allow two portions of emitted light to pass through the mask 230 and form the interference pattern 270. For example, the mask 230 includes two pinhole openings or two parallel slit openings, which create two separate paths for the light. The portions of light that pass through each opening interfere with each other, creating alternating regions of constructive interference and destructive interference. In regions of constructive interference, light emitted by the two paths is additive. Conversely, in regions of destructive interference, light emitted by the two paths cancels each other out. These alternating regions of constructive interference and destructive interference form an interference pattern across the target area 280 with alternating illuminated and non-illuminated regions. Examples of interference patterns generated by the light source assembly 220 and the mask 230 are illustrated in FIGS. 3 and 4.

In some embodiments, the light source assembly 220 includes multiple light sources located in different positions relative to the mask 230. Based on the relative positions of the light sources, light emitted by each light source forms a respective interference pattern when passed through the mask 230. Each interference pattern has a phase, which is based on the position of the light source. The different light sources produce constructive and destructive regions at different positions, i.e., at positions that are offset relative to one another in phase. Three exemplary interference patterns with offset phases are illustrated in FIG. 4.

In some embodiments, the DCA 210 includes a beam shaping element 240 positioned between the mask 230 and the eye 290. The beam shaping element 240 is configured to modify the interference pattern 270 across the target area 280. For example, the beam shaping element 240 may modify the outer edges of the interference pattern 270 so that the interference pattern 270 forms a defined shape. In some embodiments, the beam shaping element 240 modifies the beam profile (general intensity envelope) of the interference pattern 270 in order to maximize the capability of the pattern to illuminate the target area 280.

The beam shaping element 240 is a device that spatially filters light. The beam shaping element 240 may be a diffractive optics element. The beam shaping element 240 may include a n×N grid of cells which can either block or transmit light to spatially modulate the phase of the interference pattern. In some embodiments, N and n are on the order of thousands, and cell size is on the order of a few micrometers in order to allow a more accurate rectangular far field intensity profile and not to allow disturbing phase shifting accuracy for the depth sensing measurements. The beam shaping element 240 may be, e.g., a computer-generated hologram, a spatial light modulator, or some combination thereof. In some embodiments, the beam shaping element 240 transforms a shape of the outer edge of the interference pattern 270 such that the interference pattern 270 has a rectangular beam profile. For example, the beam shaping element 240 may stretch the interference pattern 270 such that it fills a rectangular target area.

The camera 250 captures images of the eye 290 that include reflections of the interference pattern 270. When the interference pattern 270 reaches the eye 290, the interference pattern 270 produces the interference pattern on at least a portion of a surface of the eye. This interference pattern is captured by the camera 250. The camera 250 may be, e.g., an array (1D or 2D) of photodiodes, a charge coupled display (CCD) array, some other device capable of detecting some or all of the target area 280, or some combination thereof.

The camera 250 is configured to capture images of light in the frequency band(s) and/or polarization(s) that are emitted by the light source assembly 220. For example, if the light source assembly 220 emits light in the infrared band (~750 nm to 2500 nm) or some portion of the infrared band, the camera 250 is configured to capture images of the reflected patterned light, which is in this infrared band or portion of the infrared band. For example, the camera 250 can include a silicon-based infrared detector, which can detect infrared light at relatively short wavelengths, e.g., 400-900 nm; an indium gallium arsenide (InGaAs) based detector, which can detect light at longer wavelengths, e.g., 900-1500 nm; or a graphene detector, which can detect infrared light across a broad range of wavelengths. In some embodiments, the camera 250 is also sensitive to other bands of light, such as a visible band. In some embodiments, the camera 250 includes an infrared filter to increase the signal-to-noise ratio of the captured light.

The tracking system further includes a controller 260, which receives images captured by the camera 250 and determines depth information based on the images. The controller 260 may further determine tracking information based on the depth information, e.g., eye tracking or facial tracking information. The determined tracking information may comprise information about a position of the user's eye or face. In particular, the controller 260 can use locations of the reflected interference pattern generated by the light source assembly 220 and mask 230 in a captured image to determine the positions of relevant features, e.g., eye position and eye-gaze, or positions of one or more other facial features. For example, for eye tracking, the controller 260 may determine a measurement of a point of gaze of the user (i.e., an eye position), the motion of the eye 290 of the user (i.e., eye movement), or both. The controller 260 may use one or more algorithms to determine tracking information based on the shape and behavior of the light, the resulting interference pattern on the eye/face, and the features that can be identified in the images of the eye/face.

For purposes of illustration, FIG. 2 shows the cross section associated with a single eye 290, a single optical element 110, and a single DCA 210, but in some embodiments, another optical element 110 and another DCA 210 (including another light source assembly 220, mask 230, beam shaping element 240, and camera 250) can be included for another eye 290 of the user. As shown in FIG. 2, the light source assembly 220 and mask 230 can be embedded in an upper portion of the frame, and the camera 250 can be embedded in a lower portion of the frame 105. However, the light source assembly 220 and mask 230 can be located in any portion of the frame 105, e.g., at the bottom, at an outer side, at an inner side, or in a corner. Similarly, the camera 250 can be located in any portion of the frame 105. For example, the camera 250 can be placed along the lower portion of the frame 105, or along a side of the frame 105. While only one camera 250 is shown in FIG. 2, the eyewear device 100 may include multiple cameras 240 per eye 290. For example, different cameras 240 may be embedded in different parts of the frame 105. Using multiple cameras 240 per eye 290 may increase the accuracy of the eye tracking, and provides redundancy in case a camera 250 breaks, becomes dirty, is blocked, or otherwise has diminished functionality.

In the example shown in FIG. 2, the light source assembly 220, mask 230, beam shaping element 240, and camera 250 of the DCA 210 are directed at the user's eye 290. In other embodiments, these elements of the DCA 210 are directed at another target area, or additional DCAs 210 are directed at one or more other target areas. For example, the target area 280 includes other one or more features, and the controller 260 is configured to determine tracking information based on depth information determined from images captured by the camera 250. For example, the target area 280 includes a different portion of the user's face (e.g., the user's mouth), or a larger portion of the user's face (e.g., eyes, nose, and cheekbones).

FIG. 3 is a diagram showing the light source assembly 305 and the mask 325 of the depth camera assembly generating an interference pattern 345 across a target area 350, in accordance with one or more embodiments. The light source assembly 305 is an embodiment of the light source assembly 220 shown in FIG. 2. The light source assembly 305 includes three lasers 310a, 310b, and 310c arranged along a line. The lasers 310a, 310b, and 310c are referred to collectively as lasers 310. In other embodiments, the light source assembly 305 includes more or fewer lasers. The lasers 310 are embodiments of the light sources described with respect to FIG. 2. For example, the lasers 310 may be VCSELs. The lasers 310 may be individually controllable, or controllable as one or more groups. The lasers 310 may have a common set of emission characteristics (e.g., wavelength of light emitted, polarization of light emitted), or one or more emission characteristics may vary between different lasers. The lasers 310 may be multiplexed based on, e.g., time, wavelength, polarization, or some combination of these or other characteristics.

In some embodiments, the light source assembly 305 is configured to time-multiplex the lasers 310, i.e., the light source assembly 305 is configured to activate each laser 310 individually, and control the lasers 310 so that one laser 310 emits at a given time. In the example shown in FIG. 3, the middle laser 310b is in an active state in which it emits emitted light 320. Lasers 310a and 310c are in an inactive state in which they do not emit light. The light source assembly 305 may place laser 310a in the active state (while lasers 310b and 310c are in an inactive state) for a given time period, followed by placing laser 310b in the active state (while lasers 310a and 310c are in the inactive state) for the given time period, followed by placing laser 310c in the active state (while lasers 310a and 310b are in the inactive state) for the given time period. The light source assembly 305 may continue to cycle through the lasers 310 in this manner. The given time period during which a laser (e.g., laser 310a) is in the active state may be on the order of microseconds to nanoseconds, depending on the type of lasers 310 used. During a given active period for a laser 310, the laser 310 may emit a single pulse or a burst of multiple pulses, e.g., one pulse for each of several modes at which the laser 310 operates.

If the light source assembly 305 time multiplexes the lasers, the camera 250 is synchronized with the lasers 310 of light source assembly 305 in order for the light emitted by each laser 310 to be properly collected. For light source assemblies 305 with high modulation frequencies (e.g., above several kHz), the camera 250 may be a multi-gated detector, with each gate synchronized with a different laser 310 to collect light from that laser. For example, a first gate opens to collect light emitted from laser 310a, a second gate opens to collect light emitted from laser 310b, and a third gate opens to collect light emitted from laser 310c.

In some embodiments, the lasers 310 are multiplexed based on wavelength or polarization. For example, the light source assembly 305 is configured to set two or more lasers (e.g., lasers 310a and 310c, or all three lasers 310a, 310b, 310c) in an active state simultaneously during a given time period. The simultaneously-emitting lasers may emit light in different optical bands. For example, laser 310a emits light in one portion of the infrared band (e.g., 750 to 900 nm), and laser 310c emits light in a different portion of the infrared band (e.g., 1000 to 1150 nm). The light emitted by each laser forms a respective interference pattern at a respective optical band, and the controller can distinguish the interference patterns generated by each laser based on the optical bands of the captured light.

As another example, the simultaneously-emitting lasers emit light at different polarizations. For example, light emitted from the laser 310b passes through one polarizer, so that the emitted light 320 has one type of polarization (e.g., horizontal polarization), and light emitted from the laser 310c passes through a different polarizer, so that the light emitted from the laser 310c and passing through the other polarizer has a different type of polarization (e.g., vertical polarization). The light emitted by each laser forms a respective interference pattern at a respective optical band, and the controller can distinguish the interference patterns generated by each laser based on the polarizations of the captured light.

In some embodiments, more simultaneously-emitting lasers emit light at various combinations of polarization and wavelength. Light that passes through a mask does not interfere with light of a different wavelength or with light of an orthogonal polarization. As one example, laser 310a emits light with wavelength 800 nm that passes through a vertical polarizer, laser 310b emits light with wavelength 800 nm that passes through a horizontal polarizer, and laser 310c emits light with wavelength 900 nm that passes through a vertical polarizer. The light from laser 310a does not interfere with the light from laser 310b because of their orthogonal polarizations, and the light from laser 310a does not interfere with the light from laser 310c because of their different wavelengths.

The mask 325 is an embodiment of the mask 230 shown in FIG. 2. The mask 325 includes two mask openings 330a and 330b. The line along which the three lasers 310 are arranged is on a plane parallel to the mask 325. In the embodiment shown in FIG. 3, the leftmost laser 310a is aligned with a first mask opening 330a, and the rightmost laser 310c is aligned with a second mask opening 310c. The middle laser 310b is arranged between the leftmost laser 310a and rightmost laser 310c, and between the two mask openings 330a and 330b. In other embodiments, the lasers 310 and mask openings 330 may have different relative positions than the positions shown in FIG. 3. The number of lasers 310 in the light source assembly 305, and the relative positioning of the lasers 310 and mask openings 330, can be determined to obtain a desired pattern across a given target area, e.g., a number of fringes and distance between the fringes in the interference patterns generated by the lasers 310.

The mask 325 blocks a portion of the emitted light 320 from the laser 310b, and passes two other portions of the emitted light 320 through the two respective mask openings 330a and 330b as passed light 340a and 340b. The passed light 340a and 340b are represented visually in FIG. 3 as wavefronts that expand from the mask openings 330a and 330b. The two wavefronts overlap and interact as they move away from the mask 325. This interaction creates constructive and destructive interference between the two portions of passed light 340a and 340b. The interference pattern 345 projected onto the target area 350 shows alternating regions of constructive and destructive interference formed by the two portions of passed light 340a and 340b. Regions of constructive interference, depicted as being light or white in color in FIG. 3, are also referred to as fringes. The interference pattern 345 depicted in FIG. 3 is one slice of a full interference pattern generated by the passed light 340a and 340b; the full interference pattern extends in a vertical direction shown in FIG. 3.

The interference pattern 345 has a phase that is based on the position of the laser 310b. Each laser 310a, 310b, and 310c has a different position relative to each other and relative to the positions of the mask openings 330a and 330b. Because of the different relative positions of the lasers 310, the path lengths of the two portions of passed light generated by each laser 310 vary between the lasers. For example, a path length from the laser 310a to the mask opening 330a is longer than a path length from the laser 310a to the mask opening 330b. By contrast, a path length from the laser 310b to the mask opening 330a is the same as the path length from the laser 310b to the mask opening 330b. The differences between the sets of path lengths leads to a different phase in the interference pattern produced by laser 310a from the phase in the interference pattern 320a produced by laser 310b.

FIG. 4 shows three exemplary interference patterns offset in phase, in accordance with one or more embodiments. A first interference pattern 410 is a section of the interference pattern produced by a first light source, e.g., laser 310a. The first interference pattern 410 has a period A 415, which represents the distance between two points in the interference pattern 410 having the same phase (e.g., two consecutive regions of destructive interference). The period 415 is shown in FIG. 4 extending from a first point of destructive interference (i.e., a dark region along the interference pattern 410) to a second point of destructive interference in the interference pattern 410.

A second interference pattern 420 and third interference pattern 430 are interference patterns produced by a second light source (e.g., laser 310b) and a third light source (e.g., laser 310c), respectively. The second interference pattern 420 and third interference pattern 430 have the same period A as the first interference pattern 410, but their phases are offset relative to the first interference pattern 410 and relative to each other. In this example, the second interference pattern 420 is offset in phase by 120° relative to the first interference pattern 410, and the third interference pattern 430 is offset in phase by 240° relative to the first interference pattern 410. The relative positions, wavelengths, and distances from the mask 325 of the lasers 310a, 310b, and 310c can be tuned to obtain a desired phase offset between the interference patterns 410, 420, and 430. For example, reducing the distance between the lasers 310 reduces the amount of phase offset between the interference patterns 410, 420, and 430.

Figure 5:
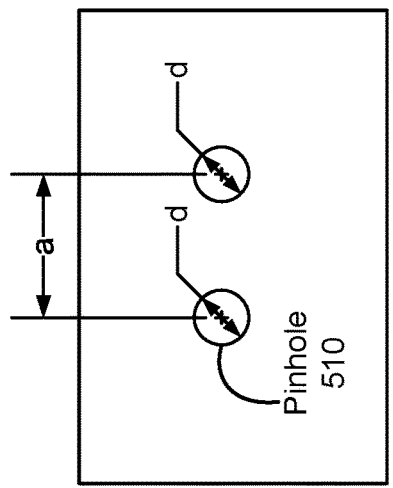
FIG. 5 shows a double pinhole mask for generating an interference pattern, in accordance with one or more embodiments.

FIG. 5 shows a double pinhole mask 500 for generating an interference pattern, in accordance with one or more embodiments. The double pinhole mask 500 has two pinholes 510 of equal size. Each pinhole 510 has a diameter d labelled in FIG. 5. A center-to-center distance, labelled a in FIG. 5, separates the centers of the two pinholes 510. The double pinhole mask 500 produces an interference pattern that generally radiates outward from the two pinholes 510, forming rings of constructive and destructive interference around the projections of each pinhole 510 at the target area. The interference pattern 345 shown in FIG. 3, and the interference patterns 410-430 shown in FIG. 4, may be portions of the interference pattern formed by the double pinhole mask 500; in particular, these are portions of the interference pattern formed by the double pinhole mask 500 from the portion of the target area that is aligned with the light source assembly 305 and pinholes 510.

The diameter d of the pinholes 510 can be selected to be sufficiently large to allow enough light to pass through the pinholes so that the camera 250 can detect the interference pattern, and selected to be small enough so that the amount of light reaching the eye 290 is below a maximum exposure limit for eye safety. The diameter d may be selected based at least in part on the brightness of the lasers 310 and the number of lasers 310 that are simultaneously active.

The center-to-center distance a between the pinholes can be determined using the formula $a=(\lambda D/\Lambda)$, where $\lambda$ is the optical wavelength of the lasers 310, D is the distance from the light source assembly 305 to the cornea of the user's eye 290, and $\Lambda$ is the period of the interference pattern. For example, to have 10 constructive interference fringes across a 40 mm illumination width, $\Lambda=4$ mm. If $\Lambda=4$ mm, $\lambda=50$ nm, and D=20 mm, the calculated center-to-center double pinhole spacing is a=4.25 µm.

Figure 6:
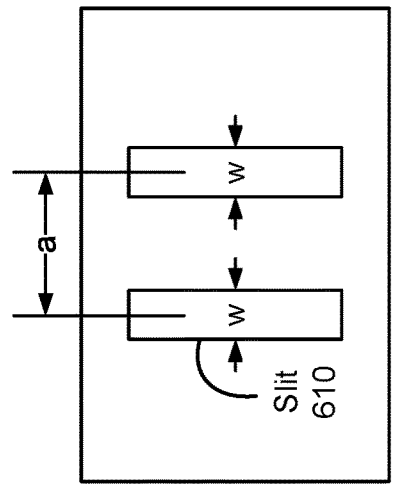
FIG. 6 shows a double slit mask for generating an interference pattern, in accordance with one or more embodiments.

FIG. 6 shows a double slit mask for generating an interference pattern, in accordance with one or more embodiments. The double slit mask 600 has two slits 610 of equal size. Each slit 610 has a width w labelled in FIG. 6. A distance, labelled a in FIG. 6, separates the centers of the two slits 610. The double slit mask 600 produces a striped interference pattern across the target area, in which the stripes extend in the same direction as the slits 610 (e.g., in a vertical direction shown in FIG. 6). The interference pattern 345 shown in FIG. 3, and the interference patterns 410-430 shown in FIG. 4, may be portions of the interference pattern formed by the double slit mask 600; the depicted interference patterns may be slices of the interference pattern formed by the double slit mask 600, and the full interference patterns extend the depicted patterns in a vertical direction.

The center-to-center distance a between the slits can be calculated in a similar manner to the center-to-center distance between the pinholes 510, as described with respect to FIG. 5. The width of the slits 610 can be selected to be sufficiently large to allow enough light to pass through the slits so that the camera 250 can detect the interference pattern, and small enough so that the amount of light reaching the eye 290 is below a maximum exposure limit for eye safety. The width w may be selected based at least in part on the brightness of the lasers 310 and the number of lasers 310 that are simultaneously active. Compared to the double pinhole mask 500, the double slit mask 600 allows a greater amount of light to pass through the mask. The double slit mask 600 may be used in applications where less powerful lasers are used, or when a greater amount of light is needed. For example, a double slit mask 600 may be used to generate an interference pattern over a larger region, e.g., a larger portion of the user's face, or an environment surrounding the users. By contrast, a double pinhole mask 500 may be used to generate an interference pattern in across a smaller target area, e.g., across a single eye. The double pinhole mask 500 may also be advantageous for eye tracking to because projecting less light may increase eye safety.

Figure 7:
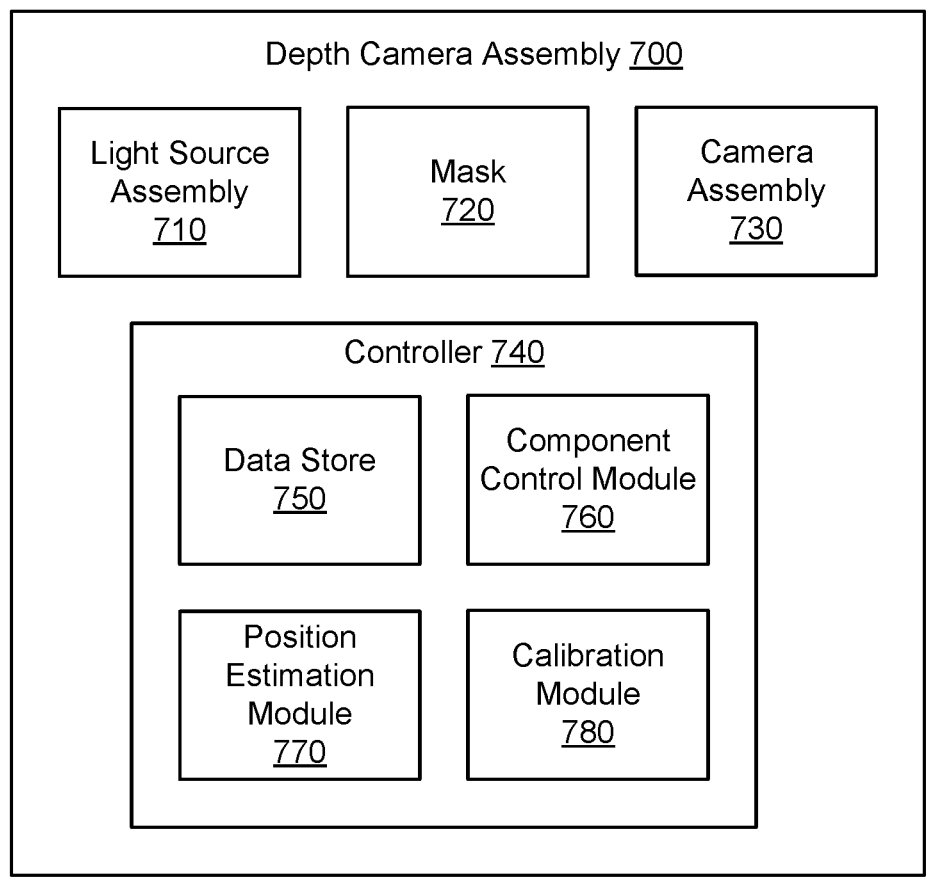
FIG. 7 is a block diagram of a depth camera assembly (DCA), in accordance with one or more embodiments.

FIG. 7 is a block diagram of a DCA 700 in accordance with one or more embodiments. The DCA 700 may be used by the eyewear device 100 shown in FIGS. 1 and 2. The DCA 700 includes a light source assembly 710, a mask 720, a camera 730, and a controller 740. In other embodiments, the DCA 700 includes additional or fewer modules than those described herein. Similarly, the functions can be distributed among the modules and/or different entities in a different manner than is described here.

The light source assembly 710 emits light that is passed through the mask 720 into a target area. The light source assembly 710 may be the light source assembly 220 described with respect to FIG. 2 or the light source assembly 305 described with respect to FIG. 3. The mask 720 may be any of the masks described with respect to FIGS. 2-6.

The camera assembly 730 captures images of the interference pattern projected across the target area. As shown in FIG. 2, the target area 280 includes the eye 290; in other embodiments, the target area includes portions of the user's face, body, surroundings, or other areas. The camera 250 in FIG. 2 is an embodiment of the camera assembly 730. In the eye tracking embodiment, the images captured by the camera assembly 730 include reflections of the interference pattern from portions of the eye 290 in the target area 280 (e.g., cornea, iris, and/or sclera). The camera assembly 730 includes one or more cameras. A camera may be, e.g., an array (1D or 2D) of photodiodes, a charge coupled display (CCD) array, some other device capable of detecting some or all of the light pattern, or some combination thereof. The camera assembly 730 may capture the images in accordance with tracking instructions from the controller 740.

The camera assembly 730 may adjust one or more imaging parameters in accordance with the tracking instructions. An imaging parameter is a parameter that affects how the camera assembly 730 captures images. An imaging parameter may include, e.g., frame rate, aperture, gain, exposure length, frame timing, some other parameter that affects how the camera assembly 730 captures images, or some combination thereof.

The controller 740 controls components of the DCA 700. The controller 740 comprises a data store 750, a component control module 760, a position estimation module 770, and a calibration module 780. In other embodiments, the controller 740 comprises additional or fewer modules than those described herein. Similarly, the functions can be distributed among the modules and/or different entities in a different manner than is described here.

The data store 750 is a memory that stores information for the DCA 700. The stored information may include, e.g., tracking instructions, emission parameters for the light source assembly 710, parameters of the mask 720, imaging parameters, a model (M) of the area being tracked (e.g., a model of the user's eye), images captured by the camera assembly 730, some other information that is used by the DCA 700, or some combination thereof. The data store 750 is a memory, such as a read only memory (ROM), dynamic random access memory (DRAM), static random access memory (SRAM), or some combination thereof. The data store 750 may be part of a larger digital memory of an AR or VR system. The model, M, stored in the data store 750 can be a 3D model of a target area, e.g., a portion of the eye, a user's face, a user's hand, etc.

In the eye tracking embodiment, the 3D model may include, e.g., a cornea, an iris, a pupil, a sclera, an anterior chamber, some other portion of the eye, or some combination thereof. The model M may further describe indices of refractions for some portions of the eye (e.g., the cornea, the anterior chamber, etc.) as well as air. Additionally, M may also include acceleration vectors and/or velocity vectors for the eye that describe movement of the eye. In embodiments in which both of a user's eyes are scanned, the data store 750 may contain two model's $M_1$ and $M_2$: one for each eye. The model M describes a position of the eye with six degrees of freedom, accordingly, the model M also describes an orientation of the eye. Additionally, in some embodiments, the model M may include a position of the iris relative to the cornea of the eye.

In some embodiments, the model, M may include of a number of parameters which approximately specify a shape of the eye. For example, these parameters could correspond to an average radius of the eye, an average radius of the sclera of the eye, a set of three parameters to approximate the shape of the sclera as a ellipsoid, a radius of the cornea of the eye, a measurement of the protrusion of the cornea from the sclera, a set of parameters specifying the shape of the cornea, and a point of rotation for the eye. Additional parameters may be used to account for deviations from the ideal model specified by the parameters. For example, a bulge on the eye's surface caused by a blood vessel may be accounted for in M via these additional parameters.

The component control module 760 generates tracking instructions. The tracking instructions control the light source assembly 710 and the camera assembly 730. The component control module 760 configures the light source assembly 710 so that desired light sources emit for desired time periods and/or with desired parameters. For example, the component control module 760 may instruct the light sources of the light source assembly 710 such that they are time multiplexed, wavelength multiplexed, polarization multiplexed, or have some combination of multiplexing. For example, the component control module 760 may store information describing a polarization of each light source in the light source assembly 710. The component control module 760 instructs each light source having a non-orthogonal polarization to emit light at a different time and/or with a different wavelength so that the light emitted by the light sources does not interfere and can be distinguished by the camera assembly 730.

The component control module 760 configures the camera assembly 730 to capture images such that images include some or all of the light pattern reflected off a surface of the eye. For example, the component control module 760 configures the camera assembly 730 to capture light at a given wavelength or band of wavelengths, at a given time, and/or a given polarization, based on the parameters of the light source assembly 710. The component control module 760 may also determine one or more imaging parameters and emission parameters the light source assembly 710 to, e.g., to increase signal-to-noise ratio of the reflected light pattern in the captured images. Moreover, the component control module 760 can determine one or more emission parameters of the light sources of the light source assembly 710 to ensure that the power of the emitted light is within safety thresholds. The component control module 760 generates the tracking instructions using the imaging parameters and any emission parameters. The component control module 760 provides the tracking instructions to the light source assembly 710 and the camera assembly 730.

The position estimation module 770 determines depth information using the one or more images from the camera assembly 730. Based on the depth information, the position estimation module 770 determines a position of one or more objects or features in the target area. The position estimation module 770 generates an estimate of the position of the features based on a model, M, from the data store 750 and the one or more images captured by the camera assembly 730. For example, in the eye tracking embodiment, the position estimation module 770 determines a position of one or both eyes of the user; in the facial tracking embodiment, the position estimation module 770 determines a position of one or more facial features of the user. The position estimation module 770 is a software module implemented on one or more processors, a dedicated hardware unit, or some combination thereof.

In some embodiments, the position estimation module 770 generates a 3D approximation of a surface of the eye corresponding to the area of the eye illuminated by the interference pattern. The position estimation module 770 uses the known structure of the projected interference pattern and the model M to determine a distortion of the light caused by the shape of the eye's surface (and to some extent reflections from the iris). From the distortion, the position estimation module 770 attributes depth information to different portions of the image. Using the depth information, the position estimation module 770 updates a 3D approximation of a portion of the eye. The position estimation module, 770 may use the depth information to determine eye tracking information. Eye tracking information can include, e.g., position of an eye, gaze angle, inter-pupillary distance, etc.

In some embodiments, the position estimation module 770 generates a 3D approximation of the user's face or a portion of the face (e.g., the portion of the face covered by the eyewear device 110) corresponding to the area of the face illuminated by the interference pattern. The position estimation module 770 uses the known structure of the projected interference pattern and the model M of the user's face to determine a distortion of the light caused by the shape of the facial features. From the distortion, the position estimation module 770 attributes depth information to different portions of the image. Using the depth information, the position estimation module 770 updates a 3D approximation of the user's face. The position estimation module, 770 may use the depth information to determine eye tracking information. Facial tracking information can include, e.g., markers for various facial features, e.g., cheekbones, points along the eyebrow, creases around the eye, etc.

The calibration module 780 generates or trains the model M of the target area during a calibration sequence. The calibration module 780 is a software module implemented on one or more processors, a dedicated hardware unit, or some combination thereof. The calibration sequence implemented by the calibration module 780 may involve having the camera assembly 730 capture images of the interference pattern projected into the target area. For a facial tracking example, the images may be captured as a user makes various facial movements. For the eye tracking example, the images may be captured as the eye looks at known locations; e.g., the user is instructed to look at a certain object (e.g., a virtual icon) that is displayed on an electronic display (e.g., of the eyewear device 100). The images of the interference pattern can be interpolated into a model, M, which is stored in the data store 750. Once the calibration module 580 has produced M, depth tracking (e.g., eye tracking, facial tracking, etc.) may begin. In general, depth tracking with a model, M, trained for a specific target area is more accurate than depth tracking without such a model. In some embodiments, the calibration module 780 continues to update M during tracking. In some embodiments, the system may begin tracking with a nominal model M based on statistical norms of the target area (e.g., human eyes or human faces), and the calibration module 780 updates M during tracking.

Figure 8:
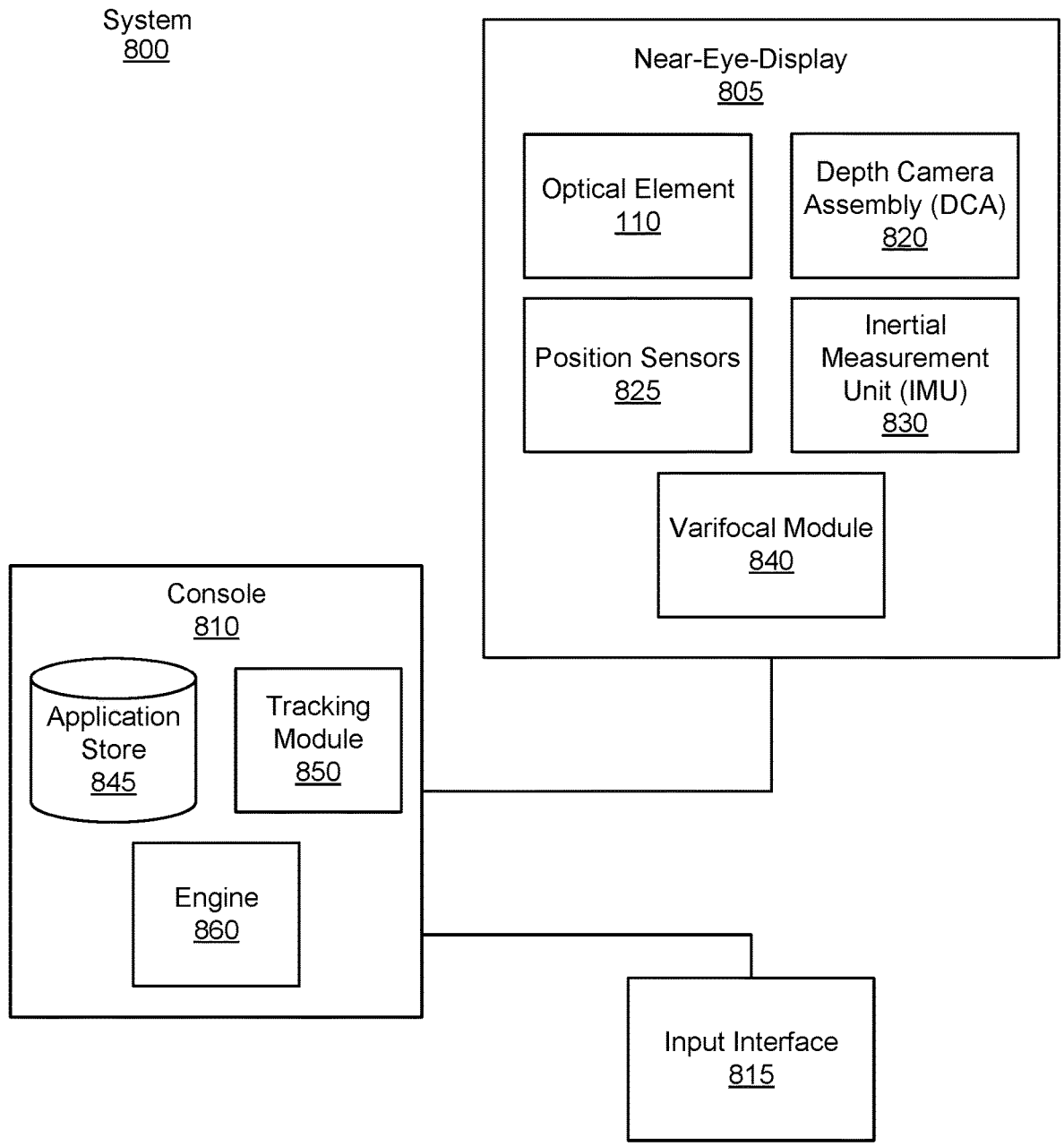
FIG. 8 is a block diagram of a near-eye artificial reality system, in accordance with one or more embodiments.

FIG. 8 is a block diagram of a near-eye-display system 800 with a depth camera assembly, in accordance with one or more embodiments. The near-eye-display system 800 may operate in an artificial reality system environment. The near-eye-display system 800 shown by FIG. 8 comprises a near-eye-display 805 and an input/output (I/O) interface 815 that are coupled to the console 810. While FIG. 8 shows an example near-eye-display system 800 including one near-eye-display 805 and one I/O interface 815, in other embodiments any number of these components may be included in the near-eye-display system 800. For example, there may be multiple near-eye-displays 805 each having an associated I/O interface 815, with each near-eye-display 805 and I/O interface 815 communicating with the console 810. In alternative configurations, different and/or additional components may be included in the near-eye-display system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the near-eye-display 805.

The near-eye-display 805 presents content to a user. The content can include artificial views of a physical, real-world environment with computer-generated elements (e.g., two-dimensional (2D) or three-dimensional (3D) images, 2D or 3D video, sound, etc.). In some embodiments, the near-eye-display 805 is the eyewear device 100. Examples of content presented by the near-eye-display 805 include one or more images, video, audio, text, or some combination thereof. In some embodiments, audio is presented via an external device (e.g., speakers and/or headphones) that receives audio information from the near-eye-display 805, the console 810, or both, and presents audio data based on the audio information. In some embodiments, the near-eye-display 805 may present artificial reality content to a user. In some embodiments, the near-eye-display 805 may augment views of a physical, real-world environment with computer-generated elements (e.g., images, video, sound, etc.).

The near-eye-display 805 includes an optical element 110 for each eye, a depth camera assembly (DCA) 820, one or more position sensors 825, an inertial measurement unit (IMU) 830, and an optional varifocal module 840. Some embodiments of the near-eye-display 805 have different components than those described here. Additionally, the functionality provided by various components described in conjunction with FIG. 8 may be differently distributed among the components of the near-eye-display 805 in other embodiments.

The optical element may include lenses, displays, filters, and any other elements described with respect to optical element 110 in relation to FIGS. 1 and 2.

The DCA 820 is an embodiment of the DCA 700 described with respect to FIG. 7. The DCA 820 captures images of interference projected across a target area. The DCA 820 can compute the depth information using the captured images, or the DCA 820 can send the captured images to another device such as the console 810 that can determine the depth information using the captured images from the DCA 820. In some embodiments, the DCA 820 is a tracking system that determines eye tracking information and/or facial tracking system associated with a user wearing the near-eye-display 805. In some embodiments, the DCA 820 is a depth camera for determining depth information about the environment of the near-eye-display 805. In some embodiments, the near-eye-display 805 includes multiple DCAs 820 configured for determining depth information about different target areas.

The IMU 830 is an electronic device that generates data indicating a position of the near-eye-display 805 based on measurement signals received from one or more of the position sensors 825. If the near-eye-display includes a DCA for capturing depth information about the environment of the near-eye-display, the IMU 830 may determine the position of the near-eye-display further based on depth information received from the DCA 820. A position sensor 825 generates one or more measurement signals in response to motion of the near-eye-display 805. Examples of position sensors 825 include: one or more accelerometers, one or more gyroscopes, one or more magnetometers, another suitable type of sensor that detects motion, a type of sensor used for error correction of the IMU 830, or some combination thereof. The position sensors 825 may be located external to the IMU 830, internal to the IMU 830, or some combination thereof.

Based on the one or more measurement signals from one or more position sensors 825, the IMU 830 generates data indicating an estimated current position of the near-eye-display 805 relative to an initial position of the near-eye-display 805. For example, the position sensors 825 include multiple accelerometers to measure translational motion (forward/back, up/down, left/right) and multiple gyroscopes to measure rotational motion (e.g., pitch, yaw, roll). In some embodiments, the IMU 830 rapidly samples the measurement signals and calculates the estimated current position of the near-eye-display 805 from the sampled data. For example, the IMU 830 integrates the measurement signals received from the accelerometers over time to estimate a velocity vector and integrates the velocity vector over time to determine an estimated current position of a reference point on the near-eye-display 805. Alternatively, the IMU 830 provides the sampled measurement signals to the console 810, which interprets the data to reduce error. The reference point is a point that may be used to describe the position of the near-eye-display 805. The reference point may generally be defined as a point in space or a position related to the near-eye-display's 805 orientation and position.

The IMU 830 receives one or more parameters from the console 810. The one or more parameters are used to maintain tracking of the near-eye-display 805. Based on a received parameter, the IMU 830 may adjust one or more IMU parameters (e.g., sample rate). In some embodiments, certain parameters cause the IMU 830 to update an initial position of the reference point so it corresponds to a next position of the reference point. Updating the initial position of the reference point as the next calibrated position of the reference point helps reduce accumulated error associated with the current position estimated the IMU 830. The accumulated error, also referred to as drift error, causes the estimated position of the reference point to "drift" away from the actual position of the reference point over time. In some embodiments of the near-eye-display 805, the IMU 830 may be a dedicated hardware component. In other embodiments, the IMU 830 may be a software component implemented in one or more processors.

In some embodiments, the varifocal module 840 is further integrated into the near-eye-display 805. The varifocal module 840 may be coupled to a DCA 820 configured for eye tracking to obtain eye tracking information determined by the DCA 820. The varifocal module 840 may be configured to adjust focus of one or more images displayed on an electronic display of the optical element 110 (e.g., a waveguide display), based on the determined eye tracking information obtained from the DCA 820. In this way, the varifocal module 840 can mitigate vergence-accommodation conflict in relation to image light. The varifocal module 840 can be interfaced (e.g., either mechanically or electrically) with the optical element 110. Then, the varifocal module 840 may be configured to adjust focus of the one or more images displayed on the electronic display by adjusting position of the display of the optical element 110, based on the determined eye tracking information obtained from the DCA 820. By adjusting the position, the varifocal module 840 varies focus of image light output from the optical element 110 towards the user's eye. The varifocal module 840 may be also configured to adjust resolution of the images displayed on the optical element 110 by performing foveated rendering of the displayed images, based at least in part on the determined eye tracking information obtained from the DCA 820. In this case, the varifocal module 840 provides appropriate image signals to the optical element 110. The varifocal module 840 provides image signals with a maximum pixel density for the electronic display of the optical element 110 only in a foveal region of the user's eye-gaze, while providing image signals with lower pixel densities in other regions of the electronic display.

The I/O interface 815 is a device that allows a user to send action requests and receive responses from the console 810. An action request is a request to perform a particular action. For example, an action request may be an instruction to start or end capture of image or video data or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 830 that captures calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the near-eye-display 805 for processing in accordance with information received from one or more of: the DCA 820, the near-eye-display 805, and the I/O interface 815. In the example shown in FIG. 8, the console 810 includes an application store 845, a tracking module 850, and an engine 860. Some embodiments of the console 810 have different modules or components than those described in conjunction with FIG. 8. Similarly, the functions further described below may be distributed among components of the console 810 in a different manner than described in conjunction with FIG. 8.

The application store 845 stores one or more applications for execution by the console 810. An application is a group of instructions, that when executed by a processor, generates content for presentation to the user. Content generated by an application may be in response to inputs received from the user via movement of the near-eye-display 805 or the I/O interface 815. Examples of applications include: gaming applications, conferencing applications, video playback applications, or other suitable applications.

The tracking module 850 calibrates the near-eye-display system 800 using one or more calibration parameters and may adjust one or more calibration parameters to reduce error in determination of the position of the near-eye-display 805 or of the I/O interface 815. For example, if the DCA 820 captures depth information about the surrounding environment of the near-eye-display 805, the tracking module 850 communicates a calibration parameter to the DCA 820 to adjust the focus of the DCA 820 to more accurately determine positions of objects in the target area captured by the DCA 820. Calibration performed by the tracking module 850 may also account for information received from the IMU 830 in the near-eye-display 805 and/or an IMU 830 included in the I/O interface 815. Additionally, if tracking of the near-eye-display 805 is lost (e.g., the DCA 820 loses line of sight of the target area), the tracking module 850 may re-calibrate some or all of the near-eye-display system 800.

The tracking module 850 tracks movements of the near-eye-display 805 or of the I/O interface 815 using information from the DCA 820, the one or more position sensors 825, the IMU 830 or some combination thereof. For example, the tracking module 850 determines a position of a reference point of the near-eye-display 805 in a mapping of a local area based on information from the near-eye-display 805. The tracking module 850 may also determine positions of the reference point of the near-eye-display 805 or a reference point of the I/O interface 815 using data indicating a position of the near-eye-display 805 from the IMU 830 or using data indicating a position of the I/O interface 815 from an IMU 830 included in the I/O interface 815, respectively. Additionally, in some embodiments, the tracking module 850 may use portions of data indicating a position or the near-eye-display 805 from the IMU 830 to predict a future location of the near-eye-display 805. The tracking module 850 provides the estimated or predicted future position of the near-eye-display 805 or the I/O interface 815 to the engine 860.

The engine 860 generates a 3D mapping of the area surrounding some or all of the near-eye-display 805 (i.e., the "local area") based on information received from the near-eye-display 805. In some embodiments, the engine 860 determines depth information for the 3D mapping of the local area based on information received from the DCA 820 that is relevant for techniques used in computing depth. The engine 860 may calculate depth information using one or more techniques in computing depth from structured light (e.g., the interference pattern). In various embodiments, the engine 860 uses the depth information to, e.g., update a model of the local area, and generate content based in part on the updated model.

The engine 860 also executes applications within the near-eye-display system 800 and receives position information, acceleration information, velocity information, predicted future positions, or some combination thereof, of the near-eye-display 805 from the tracking module 850. Based on the received information, the engine 860 determines content to provide to the near-eye-display 805 for presentation to the user. For example, if the received information indicates that the user has looked to the left, the engine 860 generates content for the near-eye-display 805 that mirrors the user's movement in a virtual environment or in an environment augmenting the local area with additional content. Additionally, the engine 860 performs an action within an application executing on the console 810 in response to an action request received from the I/O interface 815 and provides feedback to the user that the action was performed. The provided feedback may be visual or audible feedback via the near-eye-display 805 or haptic feedback via the I/O interface 815.

In some embodiments, based on the eye tracking information (e.g., orientation of the user's eye) received from a DCA 820 configured for eye tracking, the engine 860 determines resolution of the content provided to the near-eye-display 805 for presentation to the user on the electronic display of the optical element 110. The engine 860 provides the content to the near-eye-display 805 having a maximum pixel resolution on the electronic display in a foveal region of the user's gaze, whereas the engine 860 provides a lower pixel resolution in other regions of the electronic display, thus achieving less power consumption at the near-eye-display 805 and saving computing cycles of the console 810 without compromising a visual experience of the user. In some embodiments, the engine 860 can further use the eye tracking information to adjust where objects are displayed on the optical element 110 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
a light source assembly comprising a plurality of light sources, wherein (i) each light source of the plurality of light sources is configured to emit light and (ii) the plurality of light sources comprises a respective light source, wherein each light source of the plurality of light sources emits light at a same wavelength and is assigned to groups that can have two potential states:
an active state where light sources in the group emit light,
an inactive state where no light source in the group emits light, and
wherein for a given time period only one group is in an active state and any remaining groups are in the inactive state;
a mask comprising two adjacent openings that are unobstructed holes in the mask and are configured to pass through light emitted by the light source assembly, wherein the light emitted by the respective light source that is passed through a first opening of the two adjacent openings interferes with the light emitted by the respective light source that is passed through a second opening of the two adjacent openings to form an interference pattern across a target area, the interference pattern having a phase based on a position of the respective light source, and the light from each light source generates a respective interference pattern across the target area;
a camera assembly configured to capture images of a portion of the target area that includes the interference pattern; and
a controller configured to determine depth information for the portion of the target area based on the captured images.

2. The DCA of claim 1, wherein the target area comprises a user's eye, and the controller is configured to determine eye tracking information based on the depth information.

3. The DCA of claim 1, wherein the target area comprises at least a portion of a user's face, and the controller is configured to determine facial tracking information based on the depth information.

4. The DCA of claim 1, wherein the interference pattern generated by a first light source of the plurality of light sources is offset in phase from the interference pattern generated by a second light source of the plurality of light sources.

5. The DCA of claim 1, wherein the plurality of light sources comprises a first light source, a second light source, and a third light source arranged along a line in a plane parallel to the mask, wherein the first light source is aligned with a first of the two adjacent openings, the second light source is aligned with a second of the two adjacent openings, and the third light source is arranged between the first light source and the second light source.

6. The DCA of claim 1, wherein the two adjacent openings comprise a pair of parallel slits.

7. The DCA of claim 1, wherein the two adjacent openings comprise a pair of pinholes.

8. The DCA of claim 1, further comprising a beam shaping element positioned between the mask and the target area, the beam shaping element configured to modify an outer edge of the interference pattern across the target area.

9. An eyewear device comprising:
a frame;
a light source assembly coupled to the frame, the light source assembly comprising a plurality of light sources, wherein (i) each light source of the plurality of light sources is configured to emit light and (ii) the plurality of light sources comprises a respective light source, wherein each light source of the plurality of light sources emits light at a same wavelength and is assigned to groups that can have two potential states:
an active state where light sources in the group emit light, and
an inactive state where no light source in the group emits light,
wherein for a given time period only one group is in an active state, and any remaining groups are in the inactive state;
a mask coupled to the light source assembly, the mask comprising two adjacent openings that are unobstructed holes in the mask and are configured to pass through light emitted by the light source assembly, wherein the light emitted by the respective light source that is passed through a first opening of the two adjacent openings interferes with the light emitted by the respective light source that is passed through a second opening of the two adjacent openings to form an interference pattern across a target area, the interference pattern having a phase based on a position of the respective light source, and the light from each light source generates a respective interference pattern across the target area;

a camera assembly coupled to the frame, the camera assembly configured to capture images of a portion of the target area that includes the interference pattern; and a controller configured to determine depth information for the portion of the target area based on the captured images.

10. The eyewear device of claim 9, wherein the target area comprises a user's eye, and the controller is configured to determine eye tracking information based on the depth information.

11. The eyewear device of claim 9, wherein the interference pattern generated by a first light source of the plurality of light sources is offset in phase from the interference pattern generated by a second light source of the plurality of light sources.

12. The eyewear device of claim 9, wherein the two adjacent openings comprise one of a pair of parallel slits or a pair of pinholes.

13. A depth camera assembly (DCA) comprising:
a light source assembly comprising a plurality of light sources, wherein (i) each light source of the plurality of light sources is configured to emit light and (ii) the plurality of light sources comprises a respective light source, wherein each light source of the plurality of light sources is assigned to groups that can have two potential states:
an active state where light sources in the group emit light,
an inactive state where no light source in the group emits light,
wherein for a given time period only one group is in an active state and any remaining groups are in the inactive state, and
wherein a first group emits light in a different optical band than light emitted by a second group;
a mask comprising two adjacent openings that are unobstructed holes in the mask and are configured to pass through light emitted by the light source assembly, wherein the light emitted by the respective light source that is passed through a first opening of the two adjacent openings interferes with the light emitted by the respective light source that is passed through a second opening of the two adjacent openings to form an interference pattern across a target area, the interference pattern having a phase based on a position of the respective light source, and the light from each light source generates a respective interference pattern across the target area;
a camera assembly configured to capture images of a portion of the target area that includes the interference pattern; and
a controller configured to determine depth information for the portion of the target area based on the captured images.

14. The DCA of claim 13, wherein the two adjacent openings comprise one of a pair of parallel slits or a pair of pinholes.

15. The DCA of claim 13, wherein the target area comprises at least a portion of a user's face, and the controller is configured to determine facial tracking information based on the depth information.

16. The DCA of claim 13, wherein the interference pattern generated by a first light source of the plurality of light sources is offset in phase from the interference pattern generated by a second light source of the plurality of light sources.

17. A depth camera assembly (DCA) comprising:
a light source assembly comprising a plurality of light sources, wherein (i) each light source of the plurality of light sources is configured to emit light and (ii) the plurality of light sources comprises a respective light source, wherein each light source of the plurality of light sources is assigned to groups that can have two potential states:
an active state where light sources in the group emit light,
an inactive state where no light source in the group emits light,
wherein for a given time period only one group is in an active state and any remaining groups are in the inactive state, and
wherein a first group emits light that has a different polarization than light emitted by a second group;
a mask comprising two adjacent openings that are unobstructed holes in the mask and are configured to pass through light emitted by the light source assembly, wherein the light emitted by the respective light source that is passed through a first opening of the two adjacent openings interferes with the light emitted by the respective light source that is passed through a second opening of the two adjacent openings to form an interference pattern across a target area, the interference pattern having a phase based on a position of the respective light source, and the light from each light source generates a respective interference pattern across the target area;
a camera assembly configured to capture images of a portion of the target area that includes the interference pattern; and
a controller configured to determine depth information for the portion of the target area based on the captured images.

18. The DCA of claim 17, wherein the two adjacent openings comprise one of a pair of parallel slits or a pair of pinholes.

19. The DCA of claim 17, wherein the target area comprises at least a portion of a user's face, and the controller is configured to determine facial tracking information based on the depth information.

20. The DCA of claim 17, wherein the interference pattern generated by a first light source of the plurality of light sources is offset in phase from the interference pattern generated by a second light source of the plurality of light sources.

* * * * *